Nov. 15, 1960 — G. A. GIARDINI — 2,959,938
BODY COOLING DEVICE
Filed April 13, 1959 — 2 Sheets-Sheet 1

INVENTOR.
Gino A. Giardini,
BY B. Pelechowicz

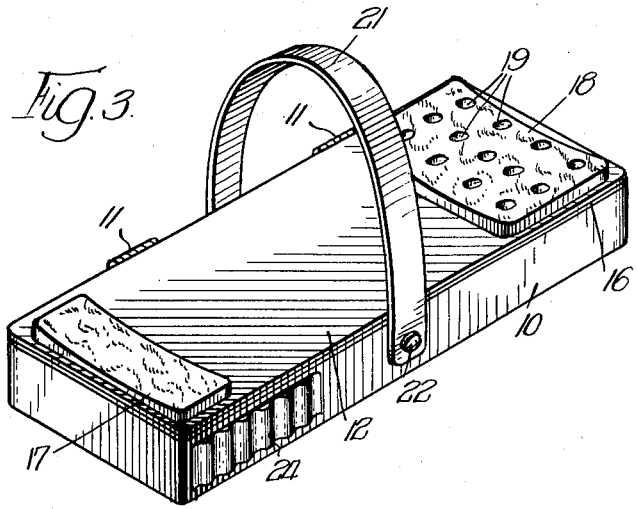
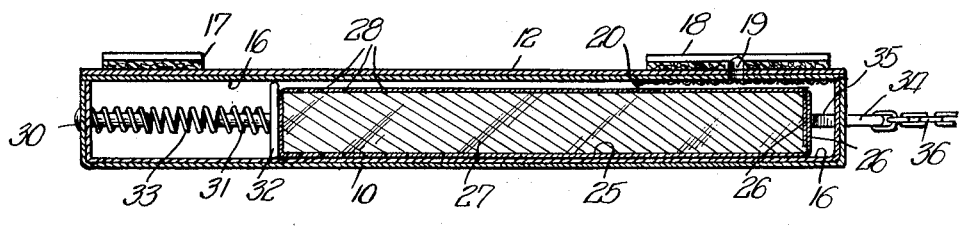
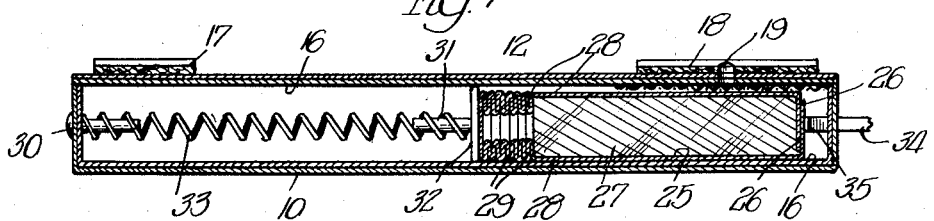

United States Patent Office 2,959,938
Patented Nov. 15, 1960

2,959,938

BODY COOLING DEVICE

Gino A. Giardini, 5827 N. Ridge, Chicago 26, Ill.

Filed Apr. 13, 1959, Ser. No. 805,796

4 Claims. (Cl. 62—384)

The present invention relates to the body cooling devices, and when applicable it has the same objects in view as are specified in my Patent 2,715,315, dated August 16, 1955.

Another important object of the present device is the provision of a casing capable of receiving therewithin a volatile substance when in a solid condition, such as Dry Ice, with means provided in the casing permitting the volatilized gas to pass outwardly of the casing and direct the same against a person's body in order to cool the same when the casing remains in contact with the body.

A still further object of the present invention is the provision in the device of the character indicated of a casing suitably insulated so as to prevent rapid volatilization of the contents of the casing, but which may be provided with apertures permitting the escape of the volatilized gas therethrough to act upon a person's body in order to cool the same when the apertures aforesaid are directed against a person's body.

A still further object of the present invention is the provision of suitable extensible means within the casing aforesaid, capable of pressing against the volatile substance when in a solid condition and shifting the same toward one end of the casing so as to maintain said substance in the proximity of the gas escape apertures, said extensible means being capable of acting upon the said substance at all times notwithstanding the diminishment of the volume of the said substance due to its gradual volatilization.

Another object of the present invention is the provision of a suitable wrapper which may be capable of inhibiting rapid volatilization of the substance contained therewithin, and which wrapper may be capable of gradually contracting, that is gradually decreasing its size in conformity with the decreasing volume of the substance brought about by its gradual volatilization.

With the above general objects in view and others that will appear as the invention is better understood, the same consists in the novel construction, combination and arrangement of parts hereinafter more fully described, illustrated in the accompanying drawings and pointed out in the appended claims.

In the drawings forming a part of this application and in which like designating characters refer to corresponding parts throughout the several views:

Fig. 3 is a perspective view of the present device with a band capable of engaging a part of person's body such as an arm for maintaining the casing in an operative position therewith;

Figure 2:
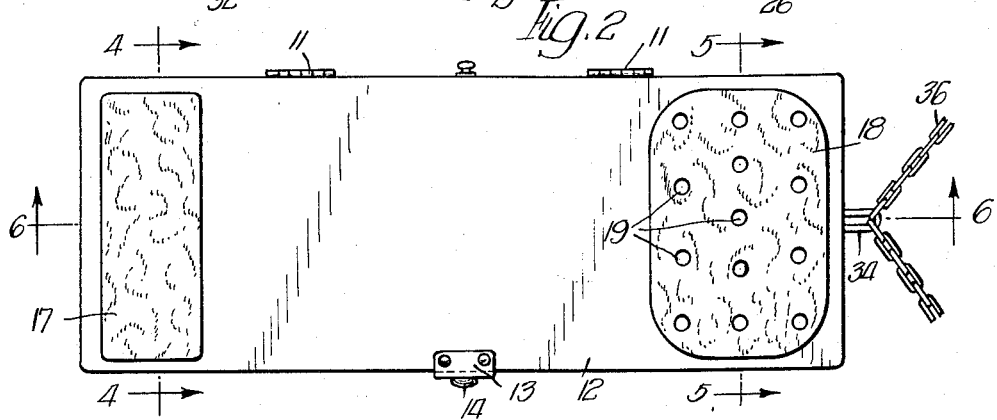
Fig. 2 is a top plan view of the closure when in a closed position with the casing, further illustrating a pair of pads, one adjacent each end of the casing, with a plurality of apertures made through the casing and one of the said pads, said pads being capable of contacting a person's body, such as an arm.

Fig. 6 is a longitudinal cross sectional view through the device, taken on line 6—6 of Fig. 2; and Fig. 7 is a similar view illustrating the changed position of the extensible element while acting upon the volatile substance when its volume has decreased due to the volatilization thereof, further illustrating the folding of the wrapper envelope as the volume of the volatile substance therewithin decreases due to its volatilization.

Figure 4:
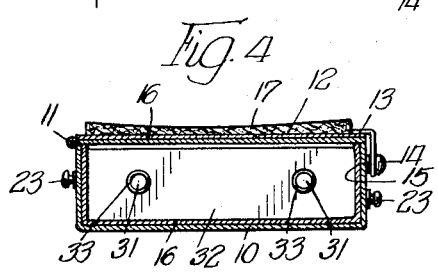
Fig. 4 is a transverse cross sectional view through the device, taken on line 4—4 of Fig. 2.
Figure 5:
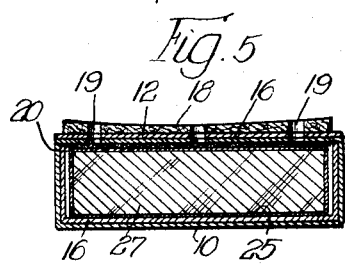
Fig. 5 is a transverse cross sectional view through the device, taken on line 5—5 of Fig. 2.

Referring in detail to the present drawings there is shown therein casing 10 of a rectangular formation, preferably made of metallic sheet material. Connected by means of hinges 11 to one longer side of casing 10 is closure 12, made of like material. Connected to the edge of said closure 12, opposite to that with which hinges 11 connect, is strap 13, which at its free end is provided with a fastener socket 14. The latter is capable of engaging fastener ball part 15 rigidly connected with the adjacent side of casing 10, as best seen in Fig. 4. Thus, snap fastener parts 14 and 15 are capable of interengagement for maintaining closure 12 in a closed position with casing 10.

The inner faces of the walls of casing 10 and the inner face of closure 12 are lined with insulating sheet 16 made either of paper or cork material.

Affixed to the outer face of closure 12, adjacent one end thereof, in a transverse relation therewith, is pad 17. A similar pad 18 is affixed to closure 12, at the opposite end thereof. Both of said pads 17 or 18 are made of soft compacted wool, sponge rubber, or any other suitable material. Both of said pads have their upper faces concaved in a transverse relation with closure 12 and casing 10, as seen in Figs. 6 and 7, in order that they may fit in contactual relation with a user's arm or any other parts of his body to which the device is applied.

Punched through closure 12, its lining 16 and pad 18 is a plurality of openings 19, effecting vents through which cool gas resulting from volatilization of solid volatile material within casing 10 is permitted to escape to act upon an area of the user's body, such as pulse area, with which pad 18 is in contact, for the purpose of cooling a person or reducing his temperature. Superimposed upon lining 16 of closure 12, at the area thereof opposite to pad 18, is netting 20, for preventing dust and dirt entering casing 10 through said openings 19.

When the device is used in a contactual relation with a person's limb, such as arm, elastic band 21 may be used to encompass the limb and maintain the device in an operative contact therewith. Provided at each end of band 21 is a socket part 22 of a snap fastener for engagement with ball parts 23 of a snap fastener, the latter rigidly affixed to the sides of casing 10, adjacent their centers. By virtue of this arrangement band 21 is subject to easy engagement with or disengagement from casing 10.

Welded, or otherwise rigidly affixed to each side of casing 10, preferably adjacent the ends thereof which are in the nearest proximity to pad 17, is strip 24, provided with a plurality of finger engaging undulations, whereby manual grasping and handling of the device may be facilitated, or in the alternative in the making of the casing the finger fitting undulations may be embossed directly upon the sides of casing 10 by suitable die during the manufacture of the casing.

Figure 1:
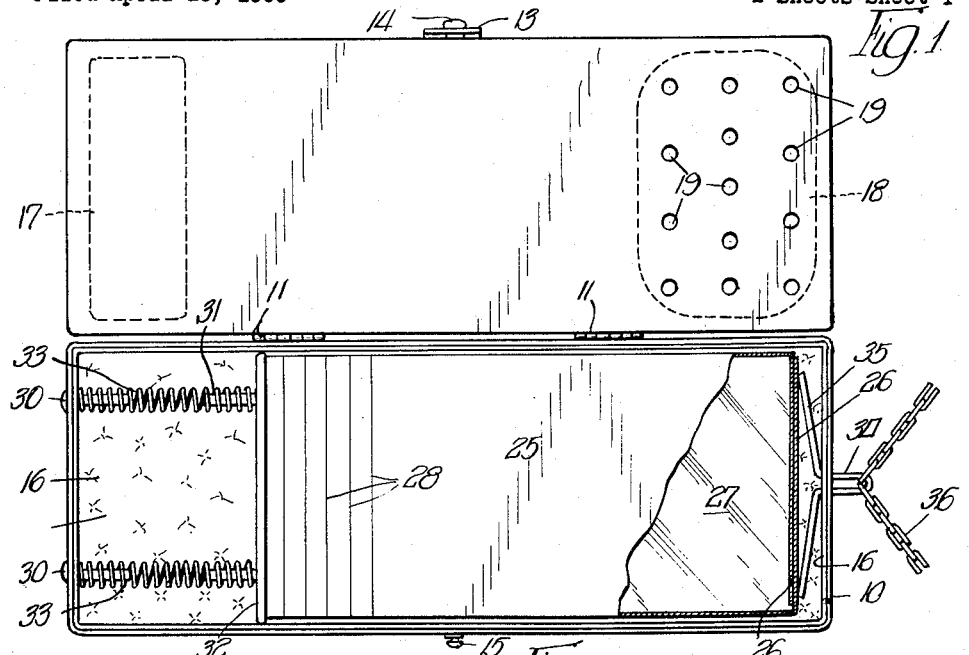
Fig. 1 is a top plan view of the casing, with the closure thereof in an open position, showing the volatile substance when in a solid condition, the latter being in a wrapper envelope, in position within the casing, with extensible element in its operative position with relation to the said substance, for pressing the latter towards one end of the casing.

Receivable within the end of casing 10, adjacent said openings 19 is an envelope or wrapper 25, preferably made of insulating and porous material such as manila paper. One end of said wrapper 25 may be provided with a pair of flaps 26, each extending from the wider side of said wrapper 25. When in an open position said flaps 26 afford an open end for said wrapper 25, through which a cake or pellet 27 of volatile material, such as Dry Ice, may be inserted into said wrapper 25. On insertion of said cake 27 within wrapper 25, said flaps 26 may be turned to a mutually overlapping relation, as is seen in Figs. 1, 6 and 7, for the purpose of providing a closure for that end of said wrapper 25. Lengthwise said wrapper 25, upon all of its four walls is provided with a plurality of creases 28, by the aid of which the wrapper material is capable of assuming bellows-like folds 29, as seen in Fig. 7, in a transverse relation with said wrapper 25, when the volume of the contents of said wrapper 25 is gradually reduced due to the volatilization of said cake 27 of volatile material, particularly when the inner end of said wrapper 25, opposite from that at which said flaps 26 are made, is under a continuing pressure.

Passed, in a rigid relation, through one end of said casing 10, and its lining 16, is a pair of pins 30, extending inwardly of said casing 10. A pair of opposed pins 31, rigidly affixed to the shiftable plate 32, coact with said pins 30 for engaging the ends of a pair of extensible coil springs 33. Normally said coil springs 33 are under a contracted tension for the purpose of bearing against said shiftable plate 32 and maintaining the latter in contact with the adjacent end of said wrapper 25 and the contents thereof. By virtue of this arrangement said plate 32 constantly bears against the adjacent end of said wrapper 25 and its contents in order to maintain the two at all times within the opposite end of said casing 10 and below said openings 19. The pressure exerted by said shiftable plate 32, by virtue of the action thereon by said springs 33, in addition to maintaining said wrapper 25 and its contents within the end of said casing 10 adjacent said openings 19, also aids said wrapper in forming the bellows folds 29 as the capacity of said wrapper 25 is gradually reduced due to the gradual decrease in volume of cake 27 due to the gradual volatilization thereof.

Insertable through an opening, made centrally in the opposite end of said casing 10 and its lining 16, that is the end adjacent said openings 19, is eye 34, from the inner end of which a pair of resilient, opposed leaves 35 extend. In the operative position of wrapper 25 and its contents 27 within casing 10, said leaves 35, by their outer free ends, remain in contact with the adjacent end of said wrapper, namely, said flaps 26, as is seen in Figs. 1, 6 and 7. Passed through said eye 34 is one or more loops of chain 36, capable of encompassing a person's neck for supporting the device thereon in a suspended relation. It is noted that eye 34, leaves 35 and chain 36 are made of a metallic conducting material so that a degree of cooling temperature engendered within casing 10 may be passed to a person's neck. When in that latter use of the device it is of course preferable that openings 19 may face a person's chest so as to cool the same by the gas emanating from the casing through said openings 19.

As is obvious, when it is not required to employ chain 36 around a person's neck, the same may be disconnected from eye 34, with said eye 34 and its end leaves 35 left in their operative position shown in Fig. 1, or in the alternative the same may be removed from the casing by shifting said eye 34 inwardly of the casing and thereupon removing it with its leaves 35 from the casing.

From the hereinabove description it will be apparent that the volatilization of the coolant is retarded due to the insulation of the walls of casing 10 and closure 12 through the insulation lining 16 as well as due to the insulation of the coolant by said wrapper 25. Of course, when more rapid volatilization of the coolant is required the solid cake 27 of the volatile material may be placed directly within the casing without the employment of wrapper 25.

As is obvious, on removal of said eye 34 and leaves 35 from the casing, the adjacent end of wrapper 25, when used, or the adjacent end of the cake of coolant material 27, when not enclosed within wrapper 25, will in either case contact with the adjacent end wall of casing 10, or more specifically its lining 16.

Whether wrapper 25 is used or not, in either event shiftable plate 32, due to the action of the extensible coil springs 33, will bear against the solid coolant in order to maintain it within the end of the casing which is adjacent to said openings 19.

Due to the fact that said leaves 35, when used, remain within the casing, the low temperature therewithin resulting from the volatilization of the coolant will be imparted thereto and transmitted therefrom through eye 34 to the loop or loops of chain 36. As the volatilization of the coolant material within casing 10 progresses, the cooling gas constantly results therefrom, with the streams thereof constantly passing through said openings 19 to act upon a person's body as hereinabove described.

From the hereinabove description it will be also apparent that access into casing 10 is had through the open upper end thereof, on opening closure 12, on first disconnecting the snap fastener 14—15.

To determine whether or not the coolant material should be renewed within casing 10, without opening closure 12, a mercurial or mechnical thermometer may be provided, either upon said closure 12 or on the bottom of casing 10, preferably the latter, with the temperature measuring portion thereof located within casing 10, and with the temperature reading portion thereof located outside of casing 10. The constant low temperature within the casing as indicated by the thermometer will indicate that no replacement of the coolant material is required.

Although casing 10 and closure 12 indicate two separate parts of the present invention, it is to be understood however that whenever the context in the foregoing description permits such designation, casing 10 is to include a container or receptacle having all its sides closed, with closure 12 defining one wall of such a casing.

It is of course understood that leaf plates or leaves 35, eye 34 and chain loop or loops 36 are all conductive, capable of transferring the cool temperature from within the casing 10 to the person's body, when the chain loop or loops 36 are coiled around a person's neck. In this mode of the use of the invention openings 19 are optional. When the device is hung upon a person's neck, and openings 19 are dispensed with, the generated gas resulting from the volatilization of pellet 27 will be able to escape from the casing through a crevice resulting from the opening in the end wall of the casing through which eye 34 is extended.

From the hereinabove description it will also be apparent that creases 28 are each continuous relative to the four walls of the wrapper case 25, and are in a transverse relation with relation to the longitudinal axis of said wrapper case 25. Said creases 28 are in a mutual spaced relation longitudinally of said wrapper case 25. As the volume of pellet 27 decreases due to the volatilization thereof, the capacity of the wrapper case 25 correspondingly decreases due to the formation of the bellows-like folds 29 resulting from said creases 28, induced by the pressure of springs 33 upon said wrapper case 25.

Although in Fig. 7, for the sake of clearness, said bellows-like folds 29 are shown as being formed at the end of said wrapper case 25 adjacent the end thereof which is in contact with shiftable plate 32, in actual practice, the formation of said folds 29 will commence throughout the entire length of said wrapper case 25, with the commencement of volatilization of pellet 27 taking place along all of the surfaces thereof. In other words the volatilization of pellet 27 takes place more or less uniformly upon all of its surfaces and along all of its three dimensions. Hence, the bellows-like folds 29 will commence to form more or less uniformly throughout the entire length of said wrapper case 25 with the commencement of volatilization of said pellet 27 from its very inception.

From the hereinabove description it will also be apparent that on removing chain 36 from eye 34 the latter may be inwardly shifted in casing 10 for withdrawing said eye 34 and the resilient leaf plates 35 from the casing. On removal thereof the adjacent end of the wrapper case 25 will directly contact with the adjacent end wall of casing 10 with which said eye 34 and plates 35 were connected prior to their removal.

The object of providing wrapper case 25 is to retard rapid volatilization of the contents thereof. Said wrapper case 25 being made of a pervious material permits gradual escape of gas into casing 10 brought about the volatilization of pellet 27.

In addition to the direct application of the device to a user's body, by means of band 21 or chain 36, the device may be carried in a person's outside or inside coat pocket, thereby obtaining a measure of relief by reducing the air temperature in the immediate environs of a person's body. In this latter use of the device band 21 should be detached from casing 10, with chain 36 optionally left in position or detached from eye 34.

While there are described herein preferred embodiments of the present invention, it is nevertheless to be understood that minor changes may be made therein without departing from the spirit and scope of the invention as claimed.

What I claim as new is:

1. A body cooling device comprising an oblong casing formed out of a rigid metallic sheet, a pellet of volatile solid material receivable within said casing, a body contacting pad of a comparatively soft material affixed to and outwardly of one wall of said casing adjacent one end thereof, said wall and said pad being provided with a plurality of alined openings permitting the escape outwardly of said casing of gas resulting from volatilization of said pellet, said pellet being of a lesser volume than the volume of said casing, a shiftable plate normally in contact with said pellet, and extensible means interposed between said plate and the opposite end of said casing for exerting continual pressure upon said pellet for maintaining the latter in its shifted position within the first named end of said casing and in an alinement with said openings.

2. A body cooling device comprising an oblong casing formed out of a rigid metallic sheet, an insulating lining upon the inner faces of the walls of said casing, a pellet of volatile solid material receivable in said casing, a pair of divergent, resilient, conductive leaf plates inwardly of said casing and adjacent one end wall thereof, a conductive eye passed through said end wall of said casing and its lining, said eye extending outwardly of said end wall, the inner ends of said leaf plates being rigidly connected to said eye, a conductive chain outwardly of said casing, said chain being formed into at least a single loop connected to said eye, and a pressure exerting means interposed between said pellet and the opposite end wall of said casing, said means exerting continuous pressure upon said pellet notwithstanding gradual reduction of its volume due to the volatilization thereof for the purpose of maintaining the adjacent end of said pellet in a constant contact with the free ends of said leaf plates.

3. A body cooling device comprising an oblong casing formed out of a rigid metallic sheet, an insulating lining upon the inner faces of the walls of said casing, a pellet of volatile solid material receivable in said casing, a wall of said casing and its lining being provided with alined openings for permitting the escape outwardly of said casing of gas resulting from volatilization of said pellet, a pair of divergent, resilient, conductive leaf plates inwardly of said casing and adjacent one end wall thereof, a conductive eye passed through said end wall of said casing and its lining, said eye extending outwardly of said end wall, the inner ends of said leaf plates being rigidly connected to said eye, a conductive chain outwardly of said casing, said chain being formed into at least a single loop connected to said eye, and a pressure exerting means interposed between said pellet and the opposite end wall of said casing, said means exerting continuous pressure upon said pellet notwithstanding gradual reduction of its volume due to the volatilization thereof for the purpose of maintaining the adjacent end of said pellet in a constant contact with the free ends of said leaf plates.

4. A body cooling device capable of application to a part of the human body, comprising an oblong casing of a substantially rectangular formation on transverse cross-section, said casing being formed out of a rigid sheet of conductive material, an oblong wrapper case formed out of a sheet of soft pervious material, said wrapper case being of a substantially rectangular formation on transverse cross-section, said wrapper case being receivable within said casing, said wrapper case being shorter than the length of said casing for defining a free space adjacent one end of the latter, said wrapper case being provided upon its lateral walls with a plurality of continuous creases, the several creases being in a mutually spaced relation and in a transverse relation with respect to the longitudinal axis of said casing, a pellet of volatile solid material receivable within and normally filling said wrapper case, a wall of said casing adjacent the opposite end thereof being provided with at least one opening for permitting the escape outwardly of said casing of gas permeating through said wrapper case and resulting from volatilization of said pellet therewithin, pressure exerting means positioned within said space and interposed between the adjacent ends of said casing and said wrapper case for urging the latter with its contents towards the opposite end of said casing and in the proximity of said opening, as the volume of said pellet is being gradually reduced due to its volatilization, said means being capable of inducing in said wrapper case the formation of bellows-like folds aided by and along said creases for the purpose of gradually reducing the capacity of said wrapper case to conform to the gradually reducing volume of said pellet resulting from volatilization of the latter, and means for affixing said casing to the part of the human body to which the device has been applied, the operation of said pressure exerting means upon said wrapper case and its contents being constant and unaffected by the gradually reducing capacity of said wrapper case and the movements of the part of the human body to which said casing has been affixed by said second named means, normally the wall of said casing having said opening being adapted to contact the part of human body to which the device has been applied so as to direct thereagainst the gas escaping through said opening.

References Cited in the file of this patent

UNITED STATES PATENTS

| | | |
|---|---|---|
| 1,941,173 | Lark-Horovitz | Dec. 26, 1933 |
| 1,951,679 | Sherrick | Mar. 20, 1934 |
| 2,288,745 | Sammis | July 7, 1942 |
| 2,715,315 | Giardini | Aug. 16, 1955 |